United States Patent [19]

Crone, Jr.

[11] 4,442,024

[45] Apr. 10, 1984

[54] CATALYST AND METHOD OF MAKING THE SAME

[75] Inventor: John M. Crone, Jr., Fishkill, N.Y.

[73] Assignee: Texaco Inc., White Plains, N.Y.

[21] Appl. No.: 346,773

[22] Filed: Feb. 9, 1982

[51] Int. Cl.$^3$ ............................................. B01J 23/42
[52] U.S. Cl. ................................... 502/334; 502/355
[58] Field of Search ............ 252/466 PT, 466 R, 472, 252/477 R

[56] References Cited

U.S. PATENT DOCUMENTS

| | | | |
|---|---|---|---|
| 4,172,047 | 10/1979 | Gandhi et al. | 252/477 R |
| 4,293,449 | 10/1981 | Herrington et al. | 252/477 R |
| 4,318,894 | 3/1982 | Hensel et al. | 252/477 R |
| 4,335,023 | 6/1982 | Dettling et al. | 252/477 R |

*Primary Examiner*—Delbert E. Gantz
*Assistant Examiner*—A. Pal
*Attorney, Agent, or Firm*—Carl G. Ries; Robert A. Kulason; Martin M. Glazer

[57] ABSTRACT

A method of forming a catalytic article includes the steps of contacting a substrate with a coating solution of an alkali aluminate for a period of time sufficient to form a film of alumina on the substrate; forming a slurry of a catalytic material, a particulate calcined alumina and a liquid carrier; contacting the film of alumina with the slurry so as to coat the alumina film with the slurry; and then calcining the slurry coated alumina film to form the catalytic article. A binder is preferably used in the slurry and the preferred catalytic material useful in the method includes those from group VIII of the Periodic Table of Elements.

11 Claims, No Drawings

CATALYST AND METHOD OF MAKING THE SAME

BACKGROUND OF THE INVENTION

1. Field of The Invention

This invention relates to catalyts and more particularly to improved methods of applying a catalytic material to an alumina catalyst.

2. The Prior Art

A calcined alumina coated metal mesh forms an effective support for many catalytic materials. Such catalysts can have many uses, such as an oxidizing catalyst useful for burning carbon monoxide or hydrocarbons in the exhaust gas streams of internal combustion engines, or as a self-regenerating filter for removing soot and other particulate matter from diesel engine exhaust gases. The formation of an alumina coated metal mesh and the addition of catalytic materials to the alumina coated metal mesh, if desired, is disclosed in many patents including co-assinged U.S. Pat. Nos. 3,227,659; 3,231,520; 3,240,698; 3,362,783; and 3,410,651. The alumina coated metal mesh can be formed by contacting a substrate, generally a metal mesh or other metallic article having an extended surface, with a coating solution which comprises an alkali metal aluminate as set forth in the prior art. After an adherent alumina film, generally of alumina trihydrate forms on the substrate, it is calcined to produce a porous alumina film. A catalytic material can then be added to the alumina film by one of several methods which have been disclosed in the prior art. The methods include applying the catalytic material to the calcined alumina film by vapor depositon, contacting the alumina film with a solution of the catalytic material, or applying the catalytic material as a paste onto the surface of the alumina and then further treating the combination to produce the desired catalytic structure.

Generally, in the various processes of applying a catalytic material to the alumina film coated substrate, it is desired to uniformly coat the substrate and to produce a catalytic article of highest efficiency using the smallest possible quantity of catalytic material. This is because catalytic materials are generally quite expensive, and any saving in the quantity of catalytic material necessary to perform a desired function, results in a large decrease in the cost of the finished catalytic article. The various previously disclosed methods of applying a catalytic material to an alumina film coated substrate have had various degrees of success in producing the uniform distribution of catalytic material, and of producing an efficient catalyst.

SUMMARY OF THE INVENTION

It now has been discovered that a highly efficient catalytic article can be formed by coating a substrate with an alumina film; forming a slurry from a catalytic material, a calcined alumina, and a carrier; contacting this slurry with the uncalcined alumina film coated substrate so as to coat the uncalcined alumina film with the slurry; and subsequently calcining the substrate having the alumina film and slurry coating. It has been found that a catalyst produced by this method is far more efficient, producing a given reaction at a lower temperature, than was a catalytic article formed by the previously known methods.

PREFERRED EMBODIMENT OF THE INVENTION

A preferred method of forming the catalytic article comprises contacting a metal substrate, preferably having an extended surface area, with an alkali aluminate coating solution for a period of time sufficient to form a film of alumina on the substrate; separating the film coated substrate from the coating solution; washing the film coated substrate of coating solution; forming a slurry of a catalytic metal, preferably from group VIII of the Periodic Table of Elements; a calcined alumina in particulate form, and a liquid carrier; and then contacting the slurry with the alumina film coated metal substrate so as to form a layer of catalytic and alumina material on the alumina film coated substrate. The article formed thereby is then calcined at a temperature between about 150° C. and 1300° C., and preferably between about 300° C. and 800° C.

The process of forming the alkali aluminate coating solution and the process of forming an adherent alumina trihydrate film on a substrate is disclosed in several coassigned U.S. patents including U.S. Pat. Nos. 3,227,659; 3,231,520; and 3,240,698, all of which are incorprated herein by reference. The exact mechanism by which the alumina film forms on the substrate is not precisely known, however, it is known that the deposited film is chiefly a trihydrate phase of the alumina.

Briefly, the alkali aluminate solution, useful in the present invention, can be prepared by dissolving metallic aluminum in a strong aqueous solution of an alkali hydroxide. Alternatively, alumina can be dissolved in an aqueous solution of an alkali hydroxide or commerically prepared alkali aluminate can be dissolved in water.

The alkali portion of the alkali aluminate is preferably sodium, however, the other alkali metals which include potassium, lithium, rubidium, or cesium can also be used. Further, other cations similar in properties to alkali metal cations can also be used to form the aluminate salt, as quaternary bases such as tetramethyl ammonium hydroxide.

The concentration of the alkali aluminate solution is preferably not less than about 0.5 molar, and is preferably in the range of from about 1 to 5 molar. Such a concentration is desirable so that a serviceable film of alumina can be deposited within a reasonable amount of time, preferably from about one to twenty hours. Preferably, metallic aluminum is maintained in contact with the solution during deposition, to replenish the sodium aluminate as it deposits onto the surface of the substrate. Depending on the concentration of sodium hydroxide present, the concentration of the sodium aluminate in the solution can vary from about 0.1 molar to about 10 molar.

Preferably, the solution is at a temperature above normal room temperature. It is desirable to have the solution at a temperature of at least 50° C. and preferably from about 80° C. to 100° C. Even though a higher temperature can be used, the temperature of the solution determines the phase of the hydrated alumina formed on the substrate. The preferred alpha alumina trihydrate forms at temperatures above about 50° C. and thus the deposition is generally preferred to occur at, or more preferably above this temperature.

The film of alumina formed is preferably substantially uniform, preferably not substantially less than about $2 \times 10^{-3}$ centimeter thick, and most preferably not less than about $1 \times 10^{-2}$ centimeter thick. Deposits of alumina of almost any thickness are possible, but coatings generally thicker than about $5 \times 10^{-1}$ centimeter are generally not useful. Preferred films are from about $1 \times 10^{-2}$ centimeter to about $8 \times 10^{-2}$ centimeter thick.

The substrate can be formed of a metal or a nonmetal and can include such materials as stainless steel, steel, nickel, iron, iron alloys, chrome-nickel alloys, titanium, sintered metal materials, refractory or ceramic materials for example high melting point glass, metal oxides e.g., magnesia and silica, or refractory metal silicates or carbides. The substrate is not restricted to any particular configuration and can have useful configurations such as bars, balls, chains, mesh, plates, saddles, sheets, tubes, wire, ribbons, chopped wire, wire mesh or the like. When the substrate is in a filament form and is enclosed in a casing or tube prior to the deposition of the alumina film on the substrate, the adherent film of alumina forms on both the filaments and on the internal surface of the casing or tube, and bonds the filaments to the interior wall of the casing or tube forming an encased catalyst. This is disclosed in coassigned U.S. Pat. No. 3,362,783.

The slurry preferably is formed by combining a catalytic material with a calcined particulate alumina material in a liquid carrier. The catalytic material is preferably soluble in the carrier. The carrier can contain other materials to help the catalytic material dissolve into the carrier and to help the catalytic material to be uniformly deposited on the various surfaces of the calcined alumina particles of the slurry.

For example, the preferred catalytic material, platinum, can be added as the chloroplatinic acid, or as one of the many soluble platinum complexes which are well known in the art. Preferred catalytic materials are those metals and their compounds found in group VIII of the Periodic Table of Elements, such as palladium, rhodium and platinum. Other useful catalytic materials are those elements and their compounds found in groups IB through VII B of the Periodic Table of Elements, such elements include copper, molydbenum, chromium, cobalt, nickel, vanadium and zinc.

The alumina used in the slurry preferably comprises calcined particles. The alumina particles can be any useful size, with a preferred size of from about 0.02 to about 20 microns. The alumina is preferably calcined before being combined with the catalytic material and carrier because if the catalytic material is combined with uncalcined alumina, upon the subsequent calcining of the alumina much of the catalytic material may become buried within the alumina and fail to participate in any catalytic reactions which occur on the surface of the alumina. Useful aluminas which can be calcined and used in the slurry include alumina trihydrate and alumina monohydrate.

The carrier can be any inorganic or organic material which is capable of suspending the alumina, and of suspending or dissolving the catalytic material. Further, the carrier should rapidly evaporate during drying or further calcining of the slurry and should not leave a residue which is harmful to the alumina or which causes the catalytic material to become inactive. Preferred carriers are liquids, such as water which has all of the desired properties and is the most preferred carrier. Other materials, such as various acids, chelating agents, and various other additives can also be added to the carrier to aid in the distribution of the catalytic material and alumina throughout the slurry, and aid in the coating of the slurry onto the uncalcined hydrated alumina film of the substrate. The carriers and other materials useful in the present invention are well known in the art.

The slurry also preferably contains a binder which holds the alumina particles together during and after calcining, and helps to prevent the flaking or powdering of the calcined alumina coating from the film covered substrate. The presently preferred binder comprises a peptized alumina hydrate which can be formed by digesting alumina trihydrate, or monohydrate, with acetic and/or nitric acid to a pH of about 3.5.

The temperature used for the calcining of the alumina hydrate which is used in the slurry, and the temperature used for calcining the slurry coated article after the addition of the slurry to the film covered substrate, can vary from about 150° C. to about 1300° C. The hydrated alumina, and the slurry coated, film covered substrate are calcined from about ½ to about 12 hours, preferably from about 1 to 4 hours. Such calcining produces a porous alumina coating which permits a large surface area to contact the exhaust gasses which are to be catalytically treated. The surface area of the catalyst can vary from a few square meters per gram to several hundred square meters per gram. The exact surface area depends on the additives found in the alumina, the temperature, the humidity and the length of time during which calcining takes place. Useful catalytic materials are metals and their compounds found in groups IB, IIB, IVB, VB, VIB, VIIB, and VIII of the Periodic Table of Elements, with those of Group VIII being most preferred. Particularly useful catalytic metals include platinum, palladium, iridium, and rhodium. The most preferred catalytic metals can be added to the alumina as the chlorometallic acid, such as chloroplatinic acid or as one of the many soluble metallic complexes well known in the art. The most preferred catalytic metals are present from about 0.05 to 10 percent by weight of all the alumina on the substrate, and preferably from about 0.2 to about 2 percent by weight of all the alumina on the substrate.

The following examples illustrate the process of the present invention, and the improved efficiency of the catalytic articles formed thereby as compared to previously used catalytic articles. The examples are only illustrative and are not meant to limit the invention in any way.

EXAMPLE 1

A reactor, which is used in all subsequent examples, was made by packing a stainless steel cylinder 1.9 centimeters in diameter and 5 centimeters in length with about 1.5 grams of stainless steel wool and then coating the cylinder and packing with a film of about 1.6 grams (generally from about 1.4 to about 1.8 grams) of alumina trihydrate. The coating was accomplished by first forming a sodium aluminate coating solution by dissolving about 29 grams of sodium hydroxide in about 5 liters of water, and adding to that about 19 grams of aluminum metal in the form of small pellets or granules. The packed reactor was immersed in the sodium aluminate coating solution, at a temperature of about 83° C., for several hours until a desired thickness of alumina film was formed on the stainless steel wool. The packed coated reactor was then removed from the coating solution, washed thoroughly and dried.

Two reactors were made as in the preceeding paragraph. About 0.005 gram of platinum as the ammonium complex solution, was added to each reactor. The ammonium complex solution was formed by combining chloroplatinic acid in an excess of ammonium hydroxide and adding between about 2 and 5 percent excess ammonium hydroxide to dissolve any precipitate in the solution. Sufficient water was then added to the solution to produce a volume of liquid which would just fill all the pores of the alumina in the reactor. The resulting solution was poured into the reactor. The reactor was then dried and calcined at about 540° C. for about 1 hour. About 100 milliliters per minute of a gas comprising about 90 milliliters of air and about 10 milliliters of a mixture of about 1 percent butane by volume in nitrogen (the butane was about 0.1 percent of the total gas mixture) was passed through the reactor. The temperature at which 50 percent of the butane was oxidized by the reactor was determined for each reactor. For one reactor the temperature was about 587° C. and for the other reactor it was about 635° C.

EXAMPLE 2

Two reactors were formed as in the first paragraph of example 1, about 0.005 gram of platinum, as the chloroplatinic acid in aqueous hydrochloric acid, was added to each reactor. A solution of catalytic metal was used which had sufficient volume to just fill all the pores of the alumina in the reactors. The reactors were dried and calcined at about 540° C. for about 1 hour. The mixture of butane, as used in example 1, was passed through the reactors. It was found that in one reactor about 50 percent of the butane was oxidized at about 659° C. and in the other about 50 percent of the butane was oxidized at about 719° C.

EXAMPLE 3

Two reactors were formed as in the first paragraph of example 1 and then calcined at about 540° C. for about 1 hour. To each calcined reactor was added a slurry comprising about 2.5 percent by weight platinum, and calcined alumina in a water carrier. The alumina used was an alpha trihydrate alumina having a particle size of about 0.2 micron, and sold under the trademark Alcoa 705. The alumina had been calcined at about 980° C. for about 2 hours prior to being used in the slurry. The slurry also included about 10 percent by weight of a binder which comprised alumina trihydrate which has been peptized with acetic and nitric acids to a pH of about 3.5. The slurry was added to the reactors by being poured into one end of the reactors. After the slurry coated the uncalcined alumina of the reactors, about 0.0074 gram of platinum was found to be contained in one reactor, and 0.0053 gram in the other reactor. The reactors containing the uncalcined alumina trihydrate film and slurry coating were calcined at about 980° C. for about 2 hours. When the butane gas mixture of example 1 was passed through the two reactors, the temperature at which 50 percent of the butane was oxidized was found to be about 489° C. for one reactor and about 487° C. for the other reactor.

EXAMPLE 4

A reactor with a slurry coating was formed as in example 3, however, the slurry used contained about 5 weight percent platinum. The formed reactor was found to contain about 0.0109 gram of platinum. The temperature for the oxidation of 50 percent of the butane in the gas stream by the reactor was found to be about 529° C.

EXAMPLE 5

A reactor with a slurry coating was formed as in example 3, however, instead of using the alpha trihydrate alumina (Alcoa 705) in the slurry, an alpha monohydrate alumina which was sold under the trademark Condea was used. The formed reactor was found to contain about 0.0085 gram of platinum. The temperature for the oxidation of 50 percent of the butane in the gas stream was found to be about 544° C.

EXAMPLE 6

A reactor was formed as in example 5, however, about 5 weight percent of dissolved platinum was used in the slurry instead of the 2.5 weight percent used in example 5. It was found that about 0.0156 gram of platinum was deposited in the reactor and that the temperature for the oxidation of 50 percent of the butane in the gas stream by the reactor was about 531° C.

EXAMPLE 7

Three reactors were formed as in the first paragraph of example 1 with each reactor having an uncalcined alumina hydrate film. A slurry was formed as in example 3 and was poured into one end of each uncalcined reactor. The slurry coated reactors were then calcined at about 540° C. for about 1 hour. About 0.0070 gram, 0.0039 gram, and 0.0035 gram of platinum respectively, were deposited in the three reactors. The temperature at which about 50 percent of the butane in the gas stream was oxidized by the reactors was about 463° C., 434° C., and 453° C., respectively.

EXAMPLE 8

A reactor was made as in example 7, however, the slurry contained about 5 percent by weight platinum. After the addition of the slurry to the reactor, it contained about 0.0085 gram of platinum. The temperature at which 50 percent of the butane in the gas stream was oxidized was about 449° C.

EXAMPLE 9

A reactor was formed as an example 7, however, the alpha trihydrate (Aloca 750) that was originally used in the slurry was replaced with a monohydrate alumina (Condea). It was found that about 0.0085 gram of platinum was deposited in the reactor, and that the temperature for the oxidation of 50 percent of the butane in the gas stream by the reactor was about 465° C.

EXAMPLE 10

A reactor was formed as in example 9, however, the slurry used contained 5 weight percent platinum, instead of the 2.5 weight percent used in example 9. It was found that about 0.0164 gram of platinum was deposited in the reactor and that the temperature at which 50 percent of the butane in the gas stream was oxidized by the reactor was about 387° C.

From the above examples it can be seen that a catalytic article formed by the process of the present invention is much more active than a catalytic article formed by the previously known methods. The higher activity of the catalytic article of the present invention is apparent from the lower temperature required for the oxidation of 50 percent of the butane in the gas stream by the catalytic article formed by the process of the present invention (examples 7 through 10), as compared to the temperature required for the reactor made using the simple addition of dissolved platinum to the calcined alumina (examples 1 and 2), and as compared to the temperature required for the catalytic article formed by adding a slurry to a calcined alumina film coated mesh (examples 3 through 5). The lower temperature necessary for the oxidation of 50 percent of the butane indicates that the catalytic article of the present invention, formed by slurry coating an uncalcined alumina film coated substrate, examples 7 through 10, is more efficient than the catalytic articles formed using the methods set forth in the other examples. The observed increase in efficiency of the new catalyst, simply by omitting a calcining step, results not only in a great saving of catalytic material, since a smaller reactor can be used to accomplish the same reaction, but also represents a large saving of energy, since the calcining step at about 540° C. which requires large quantities of energy, time and equipment can be omitted. Even without a greater efficiency, the present invention has great pratical significance because of the omission of an energy and equipment intensive step.

The examples are meant to illustrate the process of the present invention and the catalytic article formed thereby, nothing is meant to limit the invention, which is set forth in the following claims.

What is claimed is:

1. A method of forming a catalytic article consisting essentially of the steps of contacting substrate and aluminum metal with a coating solution comprising an alkali aluminate and an alkali hydroxide for a period of time sufficient to form a film of hydrated alumina on said substrate; separating said film coated substrate from said coating solution; forming a slurry of a catalytic material, a calcined alumina material and a liquid carrier; contacting said film of alumina with said slurry; and then calcining said slurry coated alumina film and substrate.

2. The method of claim 1 wherein said slurry further comprises a binder.

3. The method of claim 2 wherein said binder comprises peptized alumina.

4. The method of claim 1 wherein said carrier comprises water.

5. The method of claim 1 wherein said catalytic material comprises a water soluble form of platinum.

6. The method of claim 1 wherein said step of calcining comprises heating said slurry coated alumina film and substrate at a temperature of between about 150° C. and about 1300° C.

7. The method of claim 1 wherein said alkali aluminate comprises sodium aluminate.

8. The method of claim 1 wherein said catalytic material comprises an element selected from the group consisting of group VIII elements of the Periodic Table of Elements.

9. The method of claim 1 wherein said slurry substanially coats all of said film of alumina on said substrate.

10. A catalytic article formed by the method of claim 1.

11. A method of forming a catalytic article consisting essentially of the steps of contacting aluminum metal and a substrate having an extended surface area with a coating solution comprising sodium aluminate and sodium hydroxide for a period of time sufficient to form a film of hydrated alumina on said substrate; separating said film coated substrate from said coating solution; contacting the coated substrate with a slurry comprising a calcined particulate alumina, a catalytic material, a binder, and a liquid carrier; and then calcining said slurry coated alumina film and substrate at temperature between about 150° C. and 1300° C.

* * * * *